(12) United States Patent
Greene

(10) Patent No.: US 12,110,074 B2
(45) Date of Patent: Oct. 8, 2024

(54) BICYCLE TRAINING AID DEVICE

(71) Applicant: Shaun Greene, Plantation, FL (US)

(72) Inventor: Shaun Greene, Plantation, FL (US)

(*) Notice: Subject to any disclaimer, the term of this patent is extended or adjusted under 35 U.S.C. 154(b) by 532 days.

(21) Appl. No.: 17/484,784

(22) Filed: Sep. 24, 2021

(65) Prior Publication Data
US 2022/0009574 A1 Jan. 13, 2022

Related U.S. Application Data

(63) Continuation-in-part of application No. PCT/US2020/065106, filed on Dec. 15, 2020, which is a continuation of application No. 16/719,961, filed on Dec. 18, 2019, now Pat. No. 10,926,822.

(51) Int. Cl.
B62H 7/00 (2006.01)
B62K 3/06 (2006.01)

(52) U.S. Cl.
CPC .............. B62H 7/00 (2013.01); B62K 3/06 (2013.01); B62K 2206/00 (2013.01)

(58) Field of Classification Search
CPC ......... B62H 7/00; B62K 3/06; B62K 2206/00
USPC ..................................... 280/304.5
See application file for complete search history.

(56) References Cited

U.S. PATENT DOCUMENTS

| 3,650,544 | A | 3/1972 | Cassell |
| 5,154,096 | A | 10/1992 | Geller et al. |
| 5,259,638 | A | 11/1993 | Krauss et al. |
| 5,558,348 | A | 9/1996 | Becka |
| 5,577,750 | A | 11/1996 | Sklar |
| 5,915,711 | A | 6/1999 | Seiple |
| 5,988,663 | A | 11/1999 | Starks |
| D422,947 | S | 4/2000 | Brathwaite |
| 6,120,050 | A | 9/2000 | Tillim |
| 6,349,958 | B1 | 2/2002 | Gawlik |
| 6,398,248 | B1 | 6/2002 | Dodson |
| 6,431,422 | B1 | 8/2002 | Moore et al. |
| 6,488,302 | B2 | 12/2002 | Coates |
| 6,712,376 | B2 | 3/2004 | Eberhardt et al. |
| 6,769,708 | B2 | 8/2004 | Ackerly |
| 6,918,606 | B2 | 7/2005 | Petrishe |
| 9,051,016 | B2 | 6/2015 | Boger |
| 2012/0280471 | A1* | 11/2012 | Schexnayder ........... B62H 7/00 280/304 |
| 2018/0050748 | A1 | 2/2018 | Faust |

FOREIGN PATENT DOCUMENTS

WO 2012023092 A1 2/2012

* cited by examiner

Primary Examiner — Jacob D Knutson
Assistant Examiner — Felicia L. Brittman-Alabi
(74) Attorney, Agent, or Firm — Johnson | Dalal; Mark C. Johnson

(57) ABSTRACT

A bicycle training aid device comprising a cantilevered handle member for grasping by a user and guiding and/or supporting a bicycle, the cantilevered handle member disposed laterally adjacent to and extending in a direction outwardly away from a rear wheel of the bike and is retained on the frame of the bicycle using a plurality of attachment plates, wherein the plurality of attachment plates are configured to be coupled together with fasteners and each having a plurality clips configured to receive frame members on the frame of the bicycle.

20 Claims, 9 Drawing Sheets

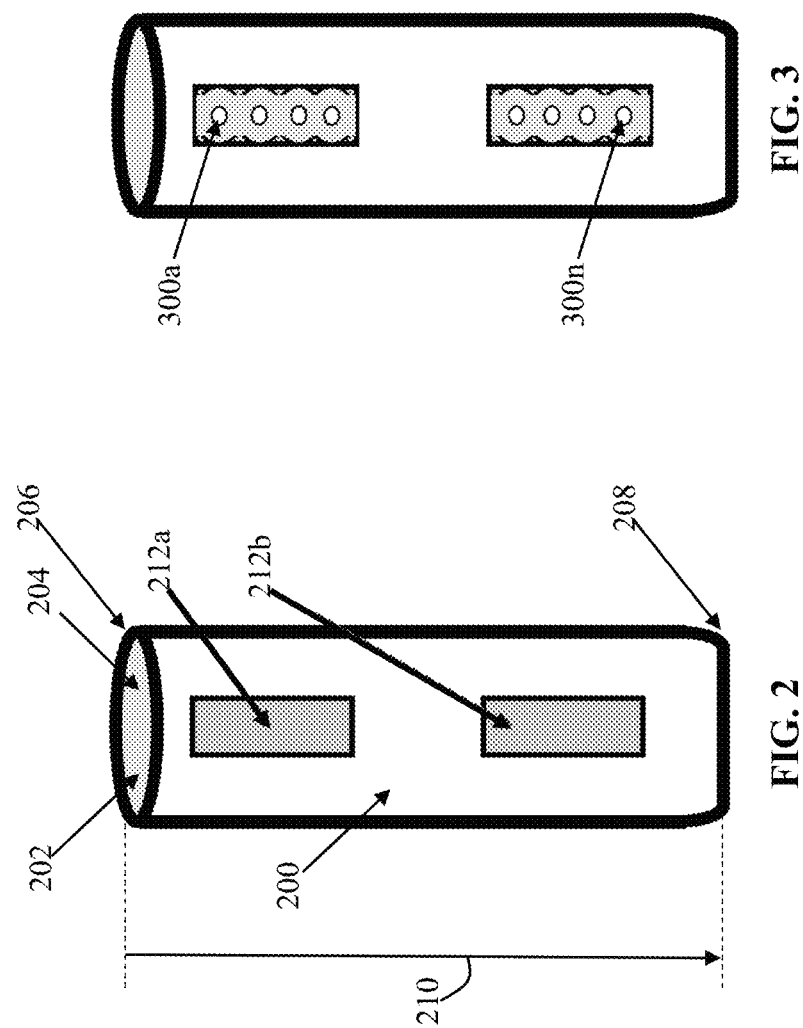

BICYCLE TRAINING AID DEVICE

FIELD OF THE INVENTION

The present invention relates generally to devices employed to train a person how to ride a bicycle without training wheels and, more particularly, relates to a bicycle training aid device intended to help the driver of the bicycle maintain proper balance to facilitate smooth and successful operation of the bicycle.

BACKGROUND OF THE INVENTION

Learning how to ride a bicycle often requires the assistance of an additional device, assembly, or method to expedite and facilitate the learning process. Oftentimes, such assistance comes in the form of a second person, generally positioned to the rider's side or rear, in holding the bicycle steady so as to maintain the proper balance needed for a smooth and continuous ride. As such, there are known devices in the marketplace which generally come in the shape of an extended pole, tube, or member attached to any one of a variety of parts of a bicycle. These known devices are designed to be attached to the bicycle at one end and to be selectively held and guided by the assisting individual at the other end. Current methods, however, fail to sufficiently adapt to diversely configured bicycles comprising various shapes, forms, and sizes. Further, many of these known devices fail to provide efficient handling and maneuvering of the bicycle, which is the ultimate purpose of such training aid devices. Many current training aid devices and assemblies are also not operably configured in such a way as to allow the extended pole, tube, or member to quickly and smoothly detach from the bicycle while in motion, forcing riders to continue riding with the device protruding outward from the bicycle which impedes on the balance of the rider and bicycle. Other devices do not provide the leverage granted to the trainee this device provides to properly support and maintain the balance of the bicycle and its driver—the same leverage afforded by a wrench and/or pliers to tighten or loosen a bolt.

Therefore, a need exists to overcome the problems with the prior art as discussed above.

SUMMARY OF THE INVENTION

The invention provides a bicycle training aid device that overcomes the hereinafore-mentioned disadvantages of the heretofore-known devices and methods of this general type and that provides for efficient handling and maneuvering of a bicycle when used to teach and train riders how to ride a bicycle.

With the foregoing and other objects in view, there is provided, in combination with a bicycle having a front wheel and a rear wheel both rotatably coupled to a frame assembly with two frame members disposed proximal to one of the at least two wheels, a bicycle training aid that includes a cantilevered handle member with a first free end, with a second end opposing the first free end, with a handle member length separating the first free end and the second end, and disposed laterally adjacent to and extending in a direction outwardly away from the rear wheel and terminating at the first free end disposed above the rear wheel. Additionally, the training aid includes a first attachment plate directly coupled to the cantilevered handle member, an upper first plate end, a lower first plate end opposing the upper first plate end, a first plate length separating the upper and lower first plate ends, a left first plate side, a right first plate side opposing the left first plate side, a first plate width separating the left and right first plate sides, a first plate lower U-shaped clip rotatably coupled to the first attachment plate in a cantilevered configuration. The first attachment plate defines a first plate adjustment channel spanning longitudinally along the first plate length and also includes a first plate upper U-shaped clip vertically adjustable within the first plate adjustment channel and disposed in a cantilevered configuration with respect to the first attachment plate. A second attachment plate is also utilized that includes an upper second plate end, a lower second plate end opposing the upper second plate end, a second plate length separating the upper and lower second plate ends, a left second plate side, a right second plate side opposing the left second plate side, a second plate width separating the left and right second plate sides, a second plate lower U-shaped clip rotatably coupled to the second attachment plate in a cantilevered configuration, and defines a second plate adjustment channel spanning longitudinally along the second plate length. The second attachment plate includes a second plate upper U-shaped clip vertically adjustable within the second plate adjustment channel and is disposed in a cantilevered configuration with respect to the second attachment plate. The first attachment plate and the second attachment plate are coupled together with a plurality of plate fasteners in a plate attachment configuration that includes the first plate lower U-shaped clip and the second plant lower U-shaped clip collectively compressively retaining at least one of the two frame members disposed proximal to one of the at least two wheels and the first plate upper U-shaped clip and the second plate upper U-shaped clip compressively retaining at least one of the two frame members disposed proximal to one of the at least two wheels.

In accordance with a further feature of the present improvement, the first and second plate lower U-shaped clips are operably configured to rotate 360°.

In accordance with another feature of the present improvement, the first and second plate upper U-shaped clips are vertically adjustably and lockably coupled to the respective first and second attachment plates.

In accordance with yet another feature of the present invention, the first and second plate adjustment channels are each disposed in a parallel configuration with one another when in the plate attachment configuration. Additionally, the first and second plate adjustment channels may each define a plurality laterally oriented and longitudinally displaced locking slats thereon, wherein the first and second plate upper U-shaped clips are vertically adjustably and lockably coupled to the respective first and second attachment plates and each disposed within one of the plurality laterally oriented and longitudinally displaced locking slats. Furthermore, the plurality locking slats may be defined on each of the first and second attachment plates are longitudinally displaced in equal lengths from one another.

In accordance with another feature, an embodiment of the present improvement includes a first plate clip peg with a first end of a shape of the plurality locking slats defined on the first attachment plate and disposed therein in the lockably coupled configuration and with a second end opposing the first end of the first plate clip peg and defining a clip channel with the upper first plate upper U-shaped clip disposed within the clip channel of the first plate clip peg and a second plate clip peg with a first end of a shape of the plurality locking slats defined on the second attachment plate and disposed therein in the lockably coupled configuration and with a second end opposing the first end of the second plate clip peg and defining a clip channel with the upper second plate upper U-shaped clip disposed within the clip channel of the second plate clip peg.

In accordance with an exemplary feature of the present invention, the first plate lower U-shaped clip, the first plate upper U-shaped clip, the second plate lower U-shaped clip, and the second plate upper U-shaped clip have surfaces defining the U-shape that are each of an elastic material.

With the foregoing and other objects in view, there is also provided, a bicycle training aid device that includes an elongated handle member with a first free end, with a second end opposing the first free end, with a handle member length separating the first free end and the second end, a first attachment plate directly coupled to the cantilevered handle member, with an upper first plate end, a lower first plate end opposing the upper first plate end, a first plate length separating the upper and lower first plate ends, a left first plate side, a right first plate side opposing the left first plate side, a first plate width separating the left and right first plate sides, with first plate lower U-shaped clip rotatably coupled to the first attachment plate in a cantilevered configuration and with a surface defining the U-shape thereon that is of an elastic material, defining a first plate adjustment channel spanning longitudinally along the first plate length, and a first plate upper U-shaped clip vertically adjustable within the first plate adjustment channel, disposed in a cantilevered configuration with respect to the first attachment plate, and with a surface defining the U-shape thereon that is of an elastic material, the handle member projecting outward from the first attachment plate in a cantilevered configuration. The training aid device may also include a second attachment plate with an upper second plate end, a lower second plate end opposing the upper second plate end, a second plate length separating the upper and lower second plate ends, a left second plate side, a right second plate side opposing the left second plate side, a second plate width separating the left and right second plate sides, with a second plate lower U-shaped clip rotatably coupled to the second attachment plate in a cantilevered configuration and with a surface defining the U-shape thereon that is of an elastic material, defining a second plate adjustment channel spanning longitudinally along the second plate length, and a second plate upper U-shaped clip vertically adjustable within the second plate adjustment channel, disposed in a cantilevered configuration with respect to the second attachment plate, and with a surface defining the U-shape thereon that is of an elastic material. The first attachment plate and the second attachment plate may be operably configured to couple together with a plurality of plate fasteners in a plate attachment configuration with the first plate lower U-shaped clip and the second plate lower U-shaped clip facing and aligned with one another and the first plate upper U-shaped clip and the second plate upper U-shaped clip facing and aligned with one another.

Although the invention is illustrated and described herein as embodied in a bicycle training aid, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time. Also, for purposes of description herein, the terms "upper", "lower", "left," "rear," "right," "front," "vertical," "horizontal," and derivatives thereof relate to the invention as oriented in the figures and is not to be construed as limiting any feature to be a particular orientation, as said orientation may be changed based on the user's perspective of the device. Furthermore, there is no intention to be bound by any expressed or implied theory presented in the preceding technical field, background, brief summary or the following detailed description.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the cantilevered handle member or the attachment, i.e., from the upper and lower ends thereof, wherein "lateral" should be understood to mean in a direction from side-to-side, e.g., opposite of the longitudinal direction or to and from the right and left plate sides.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

FIG. 2 is an elevational front view of a handle bracket member in accordance with one embodiment of the present invention;

FIG. 3 is an elevational rear view of the handle bracket member in FIG. 2 in accordance with one embodiment of the present invention;

DETAILED DESCRIPTION

Figure 1:
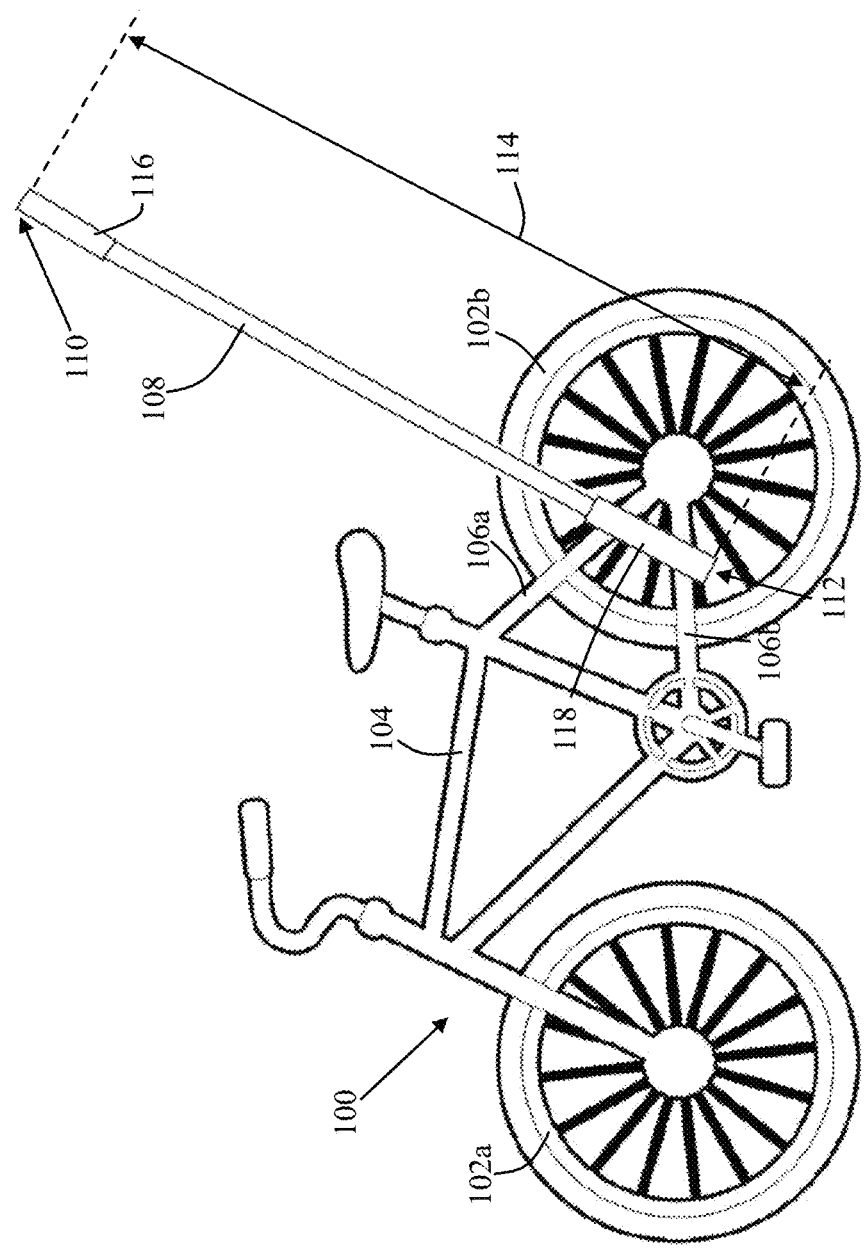
FIG. 1 is an elevational side view of an exemplary bicycle training aid in accordance with one embodiment of the present invention.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present improvement provides a novel and efficient way of aiding users in learning how to ride a bicycle. The improvement is used in combination with a bicycle 100 having a front wheel 102a and a rear wheel 102b both rotatably coupled to a frame assembly 104 with two frame members 106a-b disposed proximal to one of the at least two wheels 102a-b. The bicycle training aid accommodates bicycles 100 of different shapes and sizes, as well as bicycles 100 which have frame members 106a-b of varying widths, lengths, and forms.

Embodiments of the invention provide a cantilevered handle member 108 which selectively couples to the bicycle and adjusts in height and angle to accommodate the operator of the cantilevered handle member.

Referring now to FIG. 1, one embodiment of the present invention is shown in a side elevational view. FIG. 1 shows several advantageous features of the present invention, but, as will be described below, the invention can be provided in several shapes, sizes, combinations of features and components, and varying numbers and functions of the components. The first example of a bicycle training aid device, as shown in FIG. 1, includes the cantilevered handle member 108 with a first free end 110, a second end 112 opposing the first free end 110, and handle member length 114 (e.g., approximately 3-6 feet) separating the first free end 110 and the second end 112, the cantilevered handle member 108 disposed laterally adjacent to and extending in a direction outwardly away from the rear wheel 102b, terminating at the first free end 110 disposed above the rear wheel 102b, and defining a plurality of throughholes (e.g., numeral 516). Preferably, the free end 110 can be seen disposed approximately 2-4 feet away from a top portion of the rear tire, thereby allowing easy and effective access to the member 108 for control and/or balancing of the bicycle.

It should be understood that terms such as, "front," "rear," "side," top," "bottom," and the like are indicated from the reference point of a viewer viewing the bicycle training aid from the side of the bicycle 100 (see FIG. 1).

Figure 4:
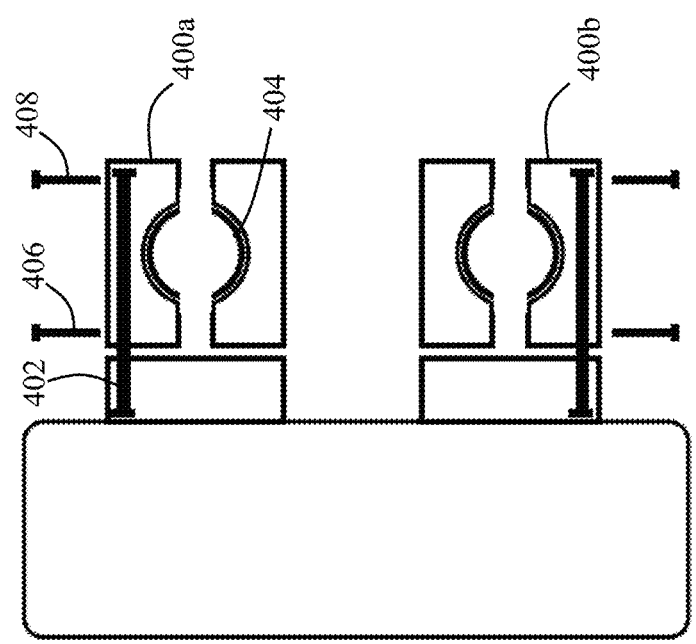
FIG. 4 is a perspective side view of a handle bracket member and two clamping members in accordance with one embodiment of the present invention.
Figure 5:
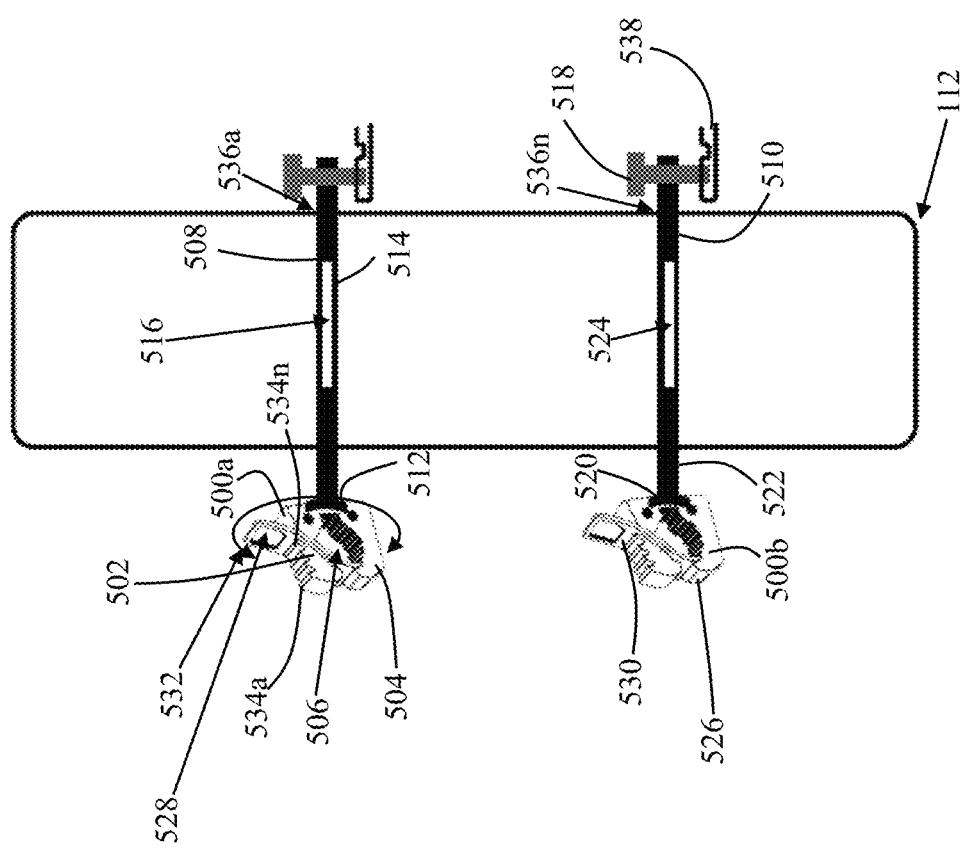
FIG. 5 is second perspective side view of a handle bracket member and two clamping members in accordance with one embodiment of the present invention.

As best seen in FIG. 4 and FIG. 5, the second end 112 further comprises two clamping members 400a-b, 500a-b, each with an upper clamping member 502 and a lower clamping member 504 defining a retention channel 506 with at least one of the two frame members 106a-b disposed therein, the upper and lower clamping members 502, 504 operably configured to selectively compress and expand with respect to one another to decrease and increase a diameter of the retention channel 506, respectively. This feature enables the two clamping members 500a-b to clamp onto frame members 106a-b of various widths and sizes. When the bicycle training aid is in use, the retention channel 506 is occupied by the frame member 106a-b through which the frame member 106a-b sits and/or is otherwise housed/retained. Unlike known bicycle training aids, the present invention is specially designed for attachment to at least two frame members 106a-b adjacent to the tire 102b (as seen in FIG. 1). As seen in FIG. 4, the clamping members 400a-b may include or may be composed of a polymeric dampening or retention material 404. Additionally, the clamping members 400a-b may be selectively opened and closed utilizing one or more upper fastener(s) 406, 408.

In alternate embodiments, the two clamping members 500a-b each further comprise a unitary body 526 with the upper and lower clamping members 502, 504 defining the U-shaped retention channel 506 and an entrance opening 528 spatially coupled to the U-shaped retention channel 506, the unitary body 526 having a strap 530 with a free end 532 operably configured to directly couple with at least one of the upper and lower clamping members 502, 504 and cause selective compression and expansion of the upper and lower clamping members 502, 504 with respect to one another.

The upper clamping member 502, lower clamping member 504, or both clamping members 502, 504 may further comprise a plurality of teeth 534a-n disposed on an upper surface, opposing an inner surface on the clamping members 502, 504 partially defining the retention channel 506, of the clamping members 502, 504 the plurality of teeth 534a-n defining a plurality of slots shaped and sized to receive a portion of the strap 530.

As further seen in FIG. 5, the second end 112 further comprises a first pin 508 and a second pin 510. Each pin 508, 510 comprises a head portion 512 and a cantilevered and elongated pin portion 514 extending from the head portion 512, 520 of the pin 508, 510 and spanning through one of the plurality of throughholes, e.g., through holes 536a-n (wherein "n" represents any number greater than one), defined by the cantilevered handle member 108, the cantilevered and elongated pin portion 514 of the pin 508, 510 having a locking aperture 516, 524 defined thereon and with a locking pin (e.g., locking pin 518) disposed within the locking aperture 516, 524 and each of the two clamping members 500*a-b* rotatably coupled to the head portion 512, 520 of each pin 508, 510. As best seen in FIG. 5, the plurality of throughholes 536*a-n* are disposed along the handle member length and are preferably proximal to the second end 112.

In one embodiment of the present improvement, and as seen in FIG. 5, the locking pin 518 is configured to lock into position through insertion into a locking clip 538 of a substantially planar shape and configured perpendicular to the locking pin 518.

In a preferred embodiment of the present improvement, the head portion 512, 520 of a substantially planar shape, is configured perpendicular to the cantilevered and elongated pin portion 514.

One embodiment of the bicycle training aid comprises the locking aperture 516, 524 as a throughole. An alternate embodiment of the present improvement comprises the locking aperture 516, 524 as an enclosed slotted channel, having a closed and defined end.

In alternate embodiments of the present improvement, the cantilevered handle member 108 further comprises a gripping member 116 disposed proximal to the first free end 110 and of an elastically resilient material. "Proximal" is defined as located at or near the first free end 110, within approximately 15-20% of the handle member length 114. The elastically resilient material encircling the gripping member 116 may be of a variety of materials including natural rubber and vinyl. This elastically resilient material aids operators of the bicycle training aid in maintaining their grip on the cantilevered handle member 108 as the bicycle 100 is in motion and in use.

As best seen in FIG. 2, an exemplary embodiment of the present improvement comprises a handle bracket 118 with an upper end 206, a lower end 208 opposing the upper end 206 of the handle bracket 118, a bracket length 210 separating the upper and lower ends 206, 208 of the handle bracket 118, an outer surface 200 coupled to the two clamping members 500*a-b* and with an inner surface 202 opposing the outer surface 200 and defining a handle placement channel 204 shaped and sized to receive the second end 112 of the cantilevered handle member 108 and a portion of the handle member length 114 spanning from the second end 112 and toward the first free end 110, the handle placement channel 204 with the cantilevered handle member 108 disposed therein. The handle bracket 118 may be operably configured to allow complete extraction and re-insertion of the cantilevered handle member 108 from within the handle placement channel 204. In the alternative, the handle bracket 118 may be operably configured to allow the cantilevered handle member 108 to extend upward away from the second end 112 and compress inward toward the second end 112, without allowing complete removal of the cantilevered handle member 108 from the handle placement channel 204. The handle bracket 118 may also include a set of slots 212*a-b* that may be enclosed and provide a user access to the fastener(s), e.g., fastener 402, thereby enabling selective disengagement or engagement of the clamping members 400*a-b*. An effective recess and structural configuration of the cantilevered handle member 108 and the handle bracket 118 can also be seen in FIGS. 6-7.

The cantilevered handle member 108, the handle bracket 118, and fasteners described herein should be preferably of a substantially rigid material, e.g., stainless steel or PVC, sufficient to withstand approximately 10-20 lbf torque applied to the free end 110 of the handle member 108 when coupled to the bike frame without plastic deformation. Additionally, the cantilevered handle member 108, the handle bracket 118, and fasteners should be of a waterproof material, e.g., stainless steel or PVC.

FIG. 3 depicts an alternate view of the handle bracket 118 wherein the handle bracket 118 may further comprise a plurality of throughholes 300*a-n* shaped and sized to receive the first and second pins 508, 510 and with two of the plurality of throughholes 300*a-n* having the first and second pins 508, 510, respectively, disposed therein. Beneficially, the plurality of throughholes 300*a-n* may be serially and vertically aligned to enable movement of the clamping members, thereby accommodating frame members of varying separation to one another.

The handle bracket 118 may further comprise at least one recessed channel 600 defined by the inner surface 202 of the handle bracket 118 and spanning in a direction along the bracket length 210 and from the upper end 206 of the handle bracket 118 toward the lower end 208 of the handle bracket 118, the at least one recessed channel 600 shaped and sized to receive a handle flange member 700 extending radially outwardly from an outer surface 702 of the cantilevered handle member 108.

Figure 7:
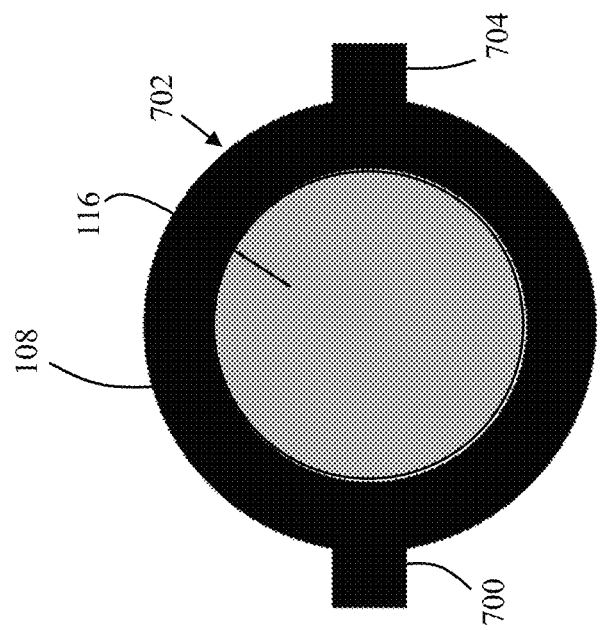
FIG. 7 is a top plan view of the cantilevered handle member in accordance with an exemplary embodiment of the present invention.
Figure 6:
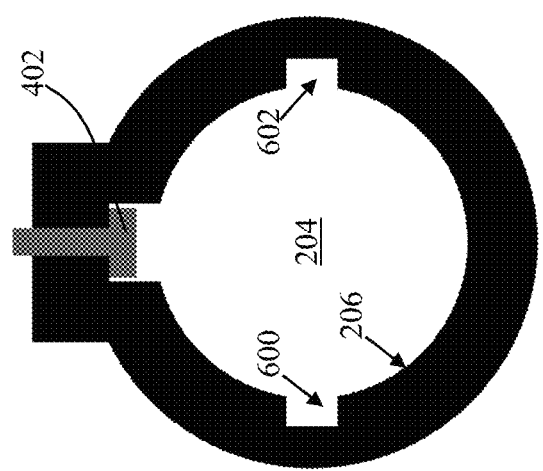
FIG. 6 is a top plan view of the handle bracket member in accordance with one embodiment of the present invention.

As depicted in FIG. 6 and FIG. 7, the handle flange member 700 is of a shape corresponding to the shape of the least one recessed channel 600. "Corresponding" is defined as substantially the same shape and, preferably in most embodiments, of substantially the same size to provide a complimentary and snug fit between them. This corresponding configuration between the handle flange member 700 and the at least one recessed channel 600 facilitates a smooth and solid movement when extending and compressing the cantilevered handle member 108 in the handle placement channel 204.

In alternate embodiments, the handle bracket 118 may comprise two or more opposing recessed channels 600, 602 defined by the inner surface 202 of the handle bracket 118 and spanning in a direction along the bracket length 210 and from the upper end 206 of the handle bracket 118 toward the lower end 208 of the handle bracket 118, the two or more opposing recessed channels 600, 602 shaped and sized to receive two or more handle flange members 700, 704 extending radially outwardly from an outer surface 702 of the cantilevered handle member 108 and in opposing directions.

The present invention also claims a bicycle training aid device comprising a cantilevered handle member 108 with a first free end 110, a second end 112 opposing the first free end 110, and handle member length 114 separating the first free end 110 and the second end 112, the cantilevered handle member 108 terminating at the first free end 110 and defining a plurality of throughholes 516; two clamping members 400*a-b*, 500*a-b*, each with an upper clamping member 502 and a lower clamping member 504 defining a retention channel 506, the upper and lower clamping members 502, 504 operably configured to selectively compress and expand with respect to one another to decrease and increase a diameter of the retention channel 506, respectively; a first pin 508 with head portion 512 and a cantilevered and elongated pin portion 514 extending from the head portion 512 of the first pin 508 and spanning through one of the plurality of through holes 536*a-n* defined by the cantilevered handle member 108, the cantilevered and elongated pin portion 514 of the first pin 508 having a locking aperture 516 defined thereon and with a locking pin 518 disposed within the locking aperture 516 and one of the two clamping members 500*a-b* rotatably coupled to the head portion 512 of the first pin 508; and a second pin 510 with head portion 520 and a cantilevered and elongated pin portion 514 extending from the head portion 520 of the second pin 510 and spanning through another of the plurality of through holes 536a-n defined by the cantilevered handle member 108, the cantilevered and elongated pin portion 514 of the second pin 510 having a locking aperture 524 defined thereon and with a locking pin 518 disposed within the locking aperture 524 and another of the two clamping members 500a-b rotatably coupled to the head portion 520 of the second pin 510.

Figure 8:
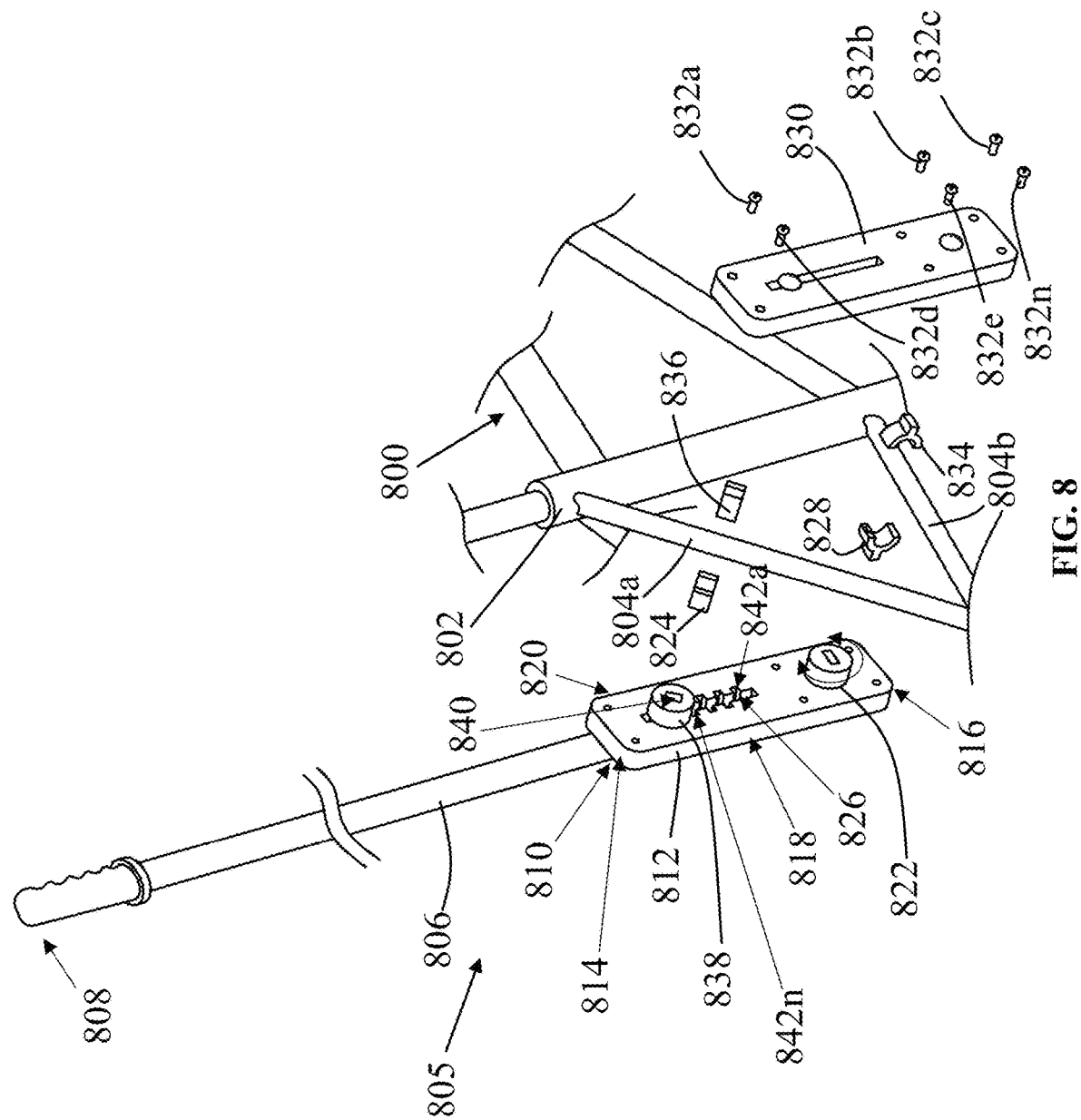
FIG. 8 is an exploded view of a bicycle training aid assembly in accordance with one embodiment of the present invention.
Figure 9:
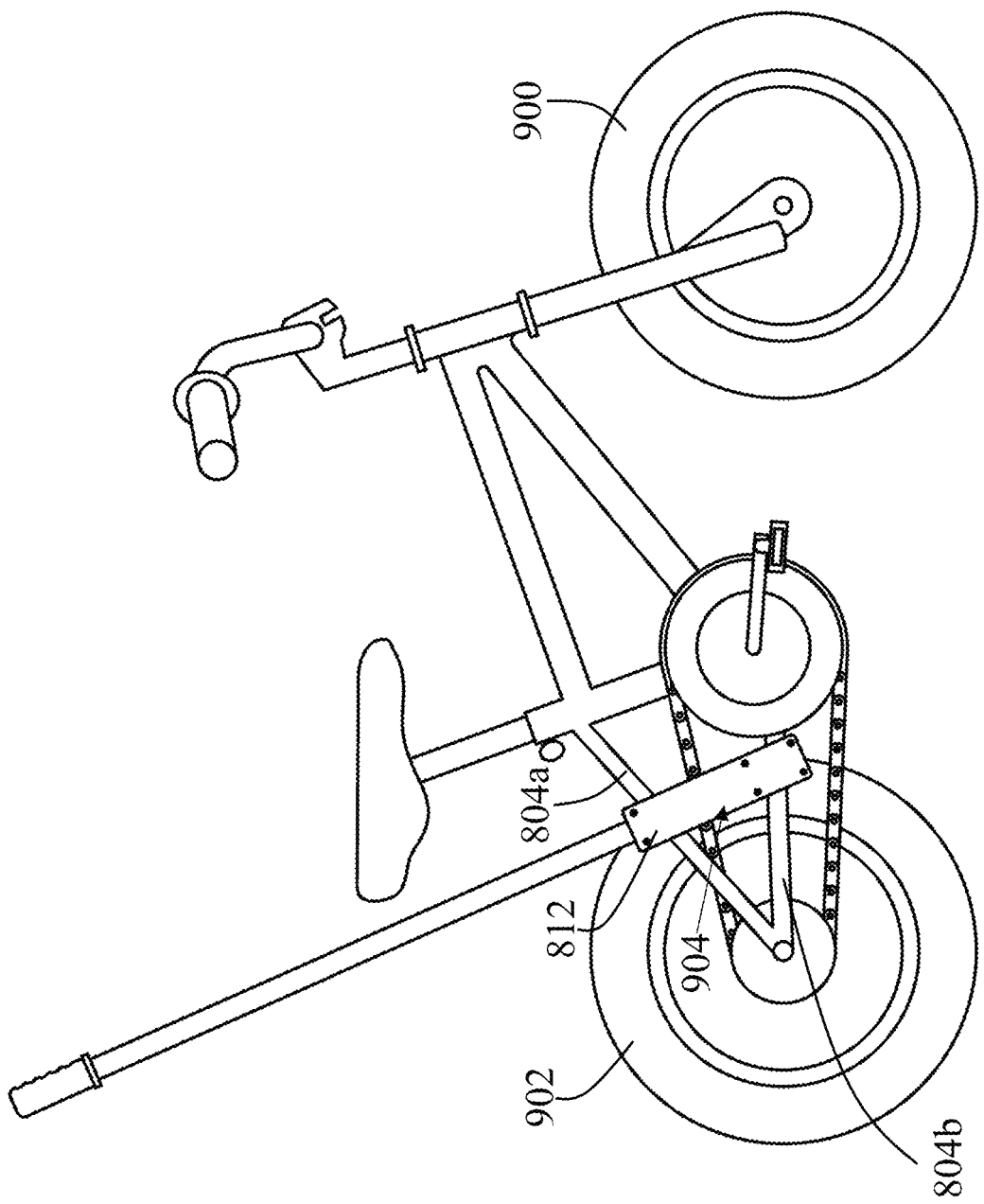
FIG. 9 is an elevational side view of the bicycle training aid assembly in FIG. 8 in accordance with one embodiment of the present invention.

With reference now to FIGS. 8-9, another embodiment of a bicycle training aid 805 is depicted in an exploded view and an elevational view, respectively. Said embodiment, may have many of the same features described above with respect to the training aids in FIGS. 1-7, e.g., material, rigidity, functionality, etc., but is specially configured to adapt to one or more two frame member(s) 804a-b on a frame assembly 802 on a bicycle 800 that includes a front wheel 900 and a rear wheel 902 both rotatably coupled to a frame assembly 802. The frame members 804a-b are preferably, however, disposed proximal to one of the at least two wheels 900, 902, i.e., at or near, within 10-15% of the overall length of the bicycle from the front or rear wheels 900, 902.

Similar to the above-described training aids, the bicycle training aid 805 can be seen having cantilevered handle member 806 with a first free end 808, a second end 810 opposing the first free end 808, with a handle member length separating the first free end 808 and the second end 810, and that is operably configured to be disposed laterally adjacent to and extending in a direction outwardly away from the rear wheel 902. The cantilevered handle member 806 terminates at the first free end 808 disposed above the rear wheel 902 to enable grasping by the user and may also include one or more grips overlaying or otherwise coupled to the handle member 806, preferably proximal to the free end 808. However, in the embodiment depicted in FIGS. 8-9, the handle member 806 is beneficially maintained and locked in said cantilevered configuration and position using a multi-plate assembly, e.g., the first and second attachment plates 812, 830.

More specifically, the first attachment plate 812 can be seen directly coupled to the cantilevered handle member 806, e.g., with fastener(s), welding, etc. In some embodiments, the cantilevered handle member 806 may be directly coupled to the upper first end 814 or may be coupled to the outer surface 904 of the first attachment plate 812. Said another way, the handle member 806 may project outward and/or upward (depend on the orientation) from the first attachment plate 812 in a cantilevered configuration 904. The first attachment plate 812 (like the second attachment plate 830) may include an upper first plate end 814, a lower first plate end 816 opposing the upper first plate end 814, a first plate length separating the upper and lower first plate ends 814, 816, a left first plate side 818, a right first plate side 820 opposing the left first plate side 818, and a first plate width separating the left and right first plate sides 818, 820. Specifically, the second attachment plate 830 may include an upper second plate end, a lower second plate end opposing the upper second plate end, a second plate length separating the upper and lower second plate ends, a left second plate side, a right second plate side opposing the left second plate side, and a second plate width separating the left and right second plate sides. The first and second plate lengths may be approximately 4-12 inches and may be substantially identical in shape and size to ensure compression of the plates 812, 830 over the one or more frame members 804a-b. The first and second plate widths may be approximately 2-6 inches and may be substantially identical in shape and size to ensure compression of the plates 812, 830 over the one or more frame members 804a-b. The plates 812, 830 may be preferably of a slender configuration (shown in the figures).

The first attachment plate 812 (like the second attachment plate 830) beneficially includes a first plate lower U-shaped clip 822 rotatably coupled (represented with arrow 828) to the first attachment plate 812 in a cantilevered configuration and defines a first plate adjustment channel 826 spanning longitudinally along the first plate length, and a first plate upper U-shaped clip 824 vertically adjustable within the first plate adjustment channel 826 and disposed in a cantilevered configuration with respect to the first attachment plate 812. The first plate upper U-shaped clip 824 (like a second plate upper U-shaped clip on the opposing attachment plate 830) may also be rotatably coupled to the first attachment plate 812. The configuration, orientation, shape, size, and functionality of the first plate lower and upper U-shaped clips 822, 824 are preferably the same as the second plate lower and upper U-shaped clips 834, 836 coupled to the second attachment plate 830. More specifically, the second plate lower U-shaped clip 834 may be rotatably coupled to the second attachment plate in a cantilevered configuration, wherein the second attachment plate 830 defines a second plate adjustment channel spanning longitudinally along the second plate length, and includes a second plate upper U-shaped clip 836 vertically adjustable within the second plate adjustment channel and disposed in a cantilevered configuration with respect to the second attachment plate 830.

With reference to both FIGS. 8-9, the first and second attachment plates 812, 830 are coupled together with a plurality of plate fasteners 832a-n (preferably with the clips 824, 828, 834, 836 interposed between) in a plate attachment configuration that includes the first plate lower U-shaped clip and the second plant lower U-shaped clip collectively compressively retaining at least one of the two frame members 804a-b disposed proximal to one of the at least two wheels 900, 902 and the first plate upper U-shaped clip and the second plate upper U-shaped clip compressively retaining at least one of the two frame members 804a-b disposed proximal to one of the at least two wheels 900, 902. Said another way (as best depicted in FIG. 8), the first attachment plate 812 and the second attachment plate 830 are operably configured to couple together with a plurality of plate fasteners 832a-n in a plate attachment configuration that includes the first plate lower U-shaped clip and the second plate lower U-shaped clip facing and aligned with one another and the first plate upper U-shaped clip and the second plate upper U-shaped clip facing and aligned with one another for receiving the at least one of the two frame members 804a-b.

To facilitate in effectively retaining frame elements or members 804a-b of varying sizes and diameters, the first plate lower U-shaped clip 822, the first plate upper U-shaped clip 824, the second plate lower U-shaped clip, and the second plate upper U-shaped clip may each have surfaces that partially or completely define the U-shape in the clips that is/are of an elastic material, e.g., natural rubber. Each of the U-shaped clips may define an arcuate surface and define a single opening that is configured, shaped, and sized to receive one of the frame elements or members 804a-b.

Additionally, the first and second plate lower U-shaped clips 828, 834 may be operably configured to rotate 360° by using a rivet or other fastener coupling the clips 828, 834 to the respective plate. Similarly, in one embodiment, the first and second plate upper U-shaped clips 824, 836 are also operably configured to rotate 360° on the respective plate to which they are attached. The first and second plate upper U-shaped clips 824, 836 may be vertically adjustably and lockably coupled to the respective first and second attachment plates 812 using, for example, a tongue-and-groove configuration (like the slat configuration depicted in FIG. 8).

Specifically, the first and second attachment plates 812, 830 may also define first and second plate adjustment channels (e.g., using channel 826 on the first attachment plate as an example of what both channels look like) that are each disposed in a parallel configuration with one another when in the plate attachment configuration. The first and second plate adjustment channels 826 may completely span through the thickness of the attachment plates 812, 830 or may be partially recessed within the attachment plates 812, 830. The first and second plate adjustment channels may also each define a plurality laterally oriented and longitudinally displaced locking slats 8 thereon, the first and second plate upper U-shaped clips 824, 836 are vertically adjustably and lockably coupled to the respective first and second attachment plates 812 and each disposed within one of the plurality laterally oriented and longitudinally displaced locking slats 842*a-n* (wherein "n" represents any number greater than one). The plurality locking slats 842*a-n* defined on each of the first and second attachment plates 812, 830 may also be longitudinally displaced in equal lengths from one another to provide for enhanced adjustability and effective coupling with the plurality of plates 812, 830. The plurality locking slats 842*a-n* may enable the clips or a corresponding peg (e.g. pegs 822, 838) coupled to one of the clips to longitudinally lock within the plate.

Specifically, in one embodiment, first plate clip peg 838 has a first end of a shape of the plurality locking slats 842*a-n* defined on the first attachment plate 812 and disposed therein in the lockably coupled configuration and with a second end opposing the first end of the first plate clip peg 838 and defining a clip channel 840 with the upper first plate upper U-shaped clip 824 disposed within the clip channel 840 of the first plate clip peg 838. Additionally, a second plate clip peg 838 may similarly include a first end of a shape of the plurality locking slats defined on the second attachment plate 830 and disposed therein in the lockably coupled configuration and with a second end opposing the first end of the second plate clip peg and defining a clip channel with the upper second plate upper U-shaped clip 836 disposed within the clip channel of the second plate clip peg. An identical configuration involving a peg and/or clip may be utilized on the second attachment plate 830. In one method of configurability and operation, a user may selectively rotate and/or translate the pegs and/or clips to a desired angle and orientation to receive one or more of the frame members 804*a-n* on the bicycle 800. With respect to the upper U-shaped clips, the user may selectively turn the clip and/or peg to an orientation that permits longitudinal translation and then, once the desired length is found, may selectively reorient (e.g., by turning) the clip and/or peg such that it falls into or is received within the desired locking slats 842*a-n*. Then, the user will sandwich or flank the desired frame member with the plurality of attachment plates 812, 830 and have the clips receive the desired frame member. Thereafter, the user will utilize one or more fasteners to retain the plurality of attachment plates 812, 830 and cause compression of the clips with the desired frame member.

Various modifications and additions can be made to the exemplary embodiments discussed without departing from the scope of the present disclosure. For example, while the embodiments described above refer to particular features, the scope of this disclosure also includes embodiments having different combinations of features and embodiments that do not include all of the above described features.

Figure 10:
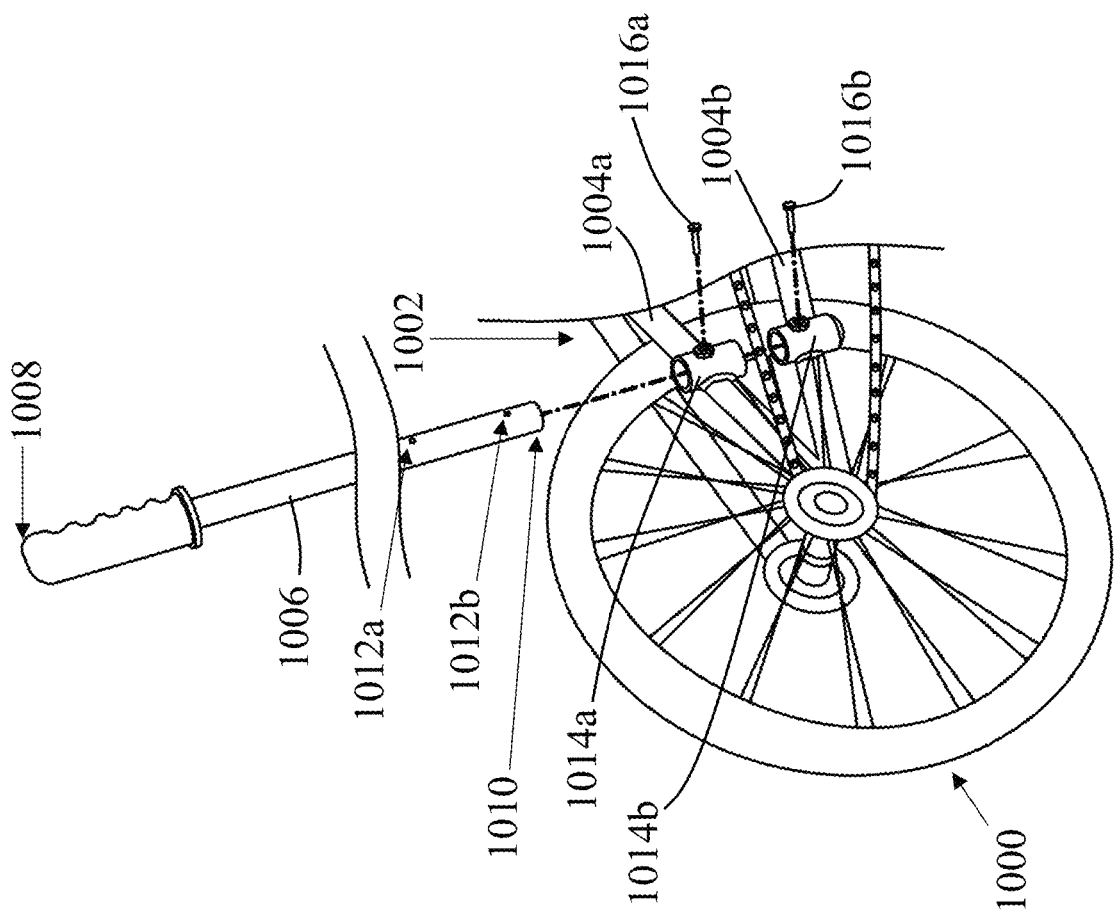
FIG. 10 is an exploded view of a bicycle training aid assembly in accordance with one embodiment of the present invention.
Figure 11:
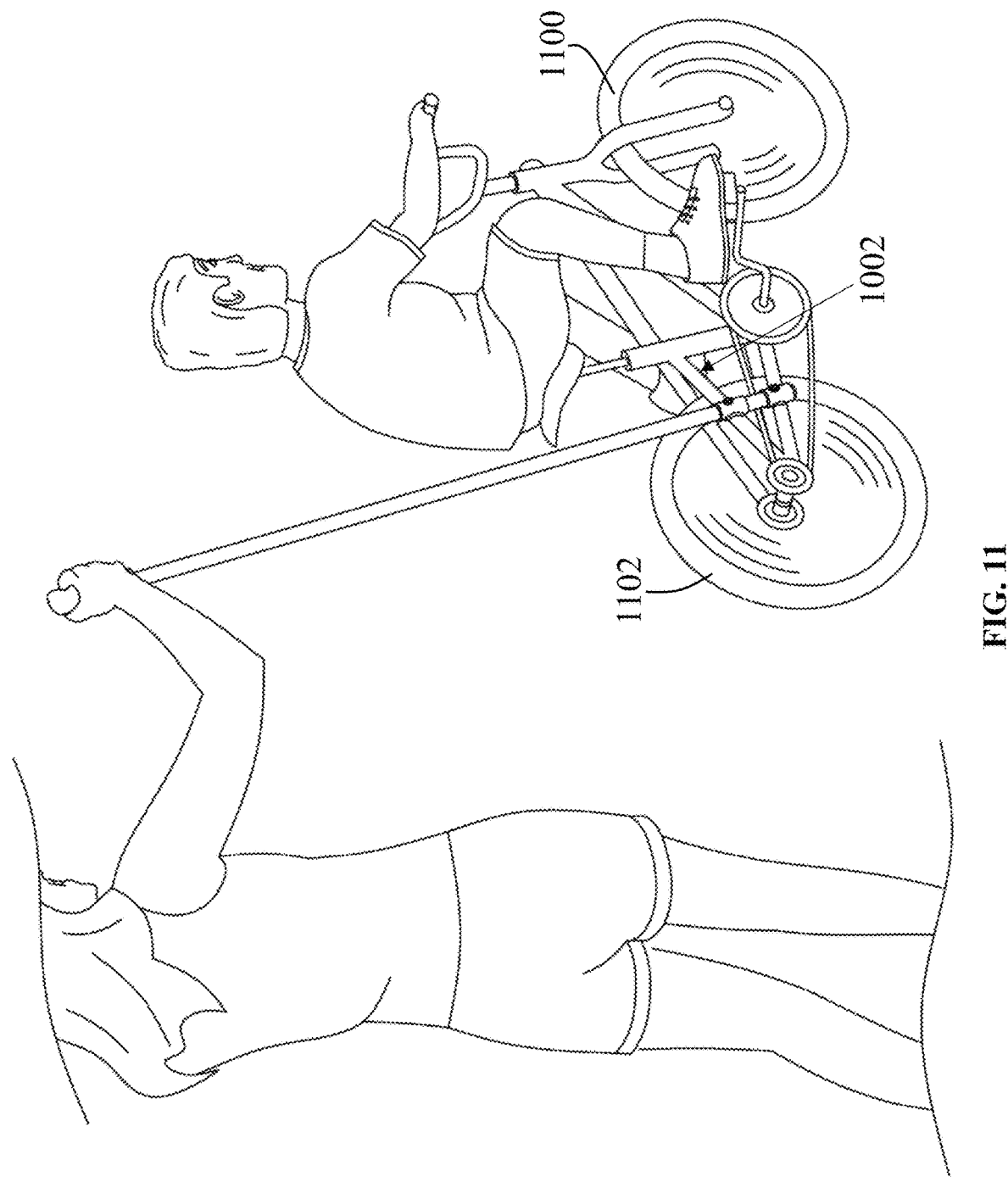
FIG. 11 is a perspective view of the bicycle training aid assembly in FIG. 10 in accordance with one embodiment of the present invention.

For example, FIGS. 10-11 depict another embodiment of the present invention, wherein the bicycle 1000 includes attachment brackets 1014*a-b* directly coupled thereto and operably configured to receive a cantilevered handle member 1006. Specifically, similar to the other embodiments, the bicycle 1000 includes a front wheel 1100 and a rear wheel 1102 both rotatably coupled to a frame assembly 1002 with two frame members 1004*a-b* disposed proximal to the rear wheel 1102. The cantilevered handle member 1006 can be seen having a first free end 1008, a second end 1010 opposing the first free end 1008, a handle member length separating the first free end 1008 and the second end 1010. The handle member length will also be of a similar length described above. The cantilevered handle member 1006 includes and defines a plurality of handle attachment apertures 1012*a-n* thereon along the handle member length. The cantilevered handle member 1006 is also disposed laterally adjacent to and extending in a direction outwardly away from the rear wheel 1102 (as shown in the figures), terminating at the first free end 1008, and is disposed (at least partially, like the above-described embodiments) above the rear wheel 1102.

However, the embodiment depicted in FIGS. 10-11 includes a first attachment bracket 1014*a* and a second attachment bracket 1014*b* directly coupled to the two frame members 1004*a-b*. The brackets 1014*a-b* may also be separate and independent of one another or may be of a single piece of material, i.e., monolithic. In one embodiment, the first and second attachment brackets 1014*a-b* are permanently coupled to the frame members 1004*a-b* with, for example, welding. In additional embodiments, the brackets 1014*a-b* may be casted or injection molded into the frame assembly 1002. Each of the attachment brackets 1014*a-b*, like the attachment plates 812, 830 are of a substantially rigid material, e.g., stainless steel. The first and second attachment brackets 1014*a-b* each include a sidewall defining an upper aperture, a lower aperture opposing the upper aperture, a bracket channel separating the upper and lower apertures of the sidewall. The first bracket channel is defined by the first attachment bracket 1014*a* and the second bracket channel is defined by the second attachment bracket 1014*b*. The first attachment bracket 1014*a* also includes a first bracket fastener aperture shaped and sized to receive a fastener, e.g., fastener 1016*a*.

The second attachment bracket 1014*b* includes the second bracket channel which is axially aligned with the first bracket channel, thereby providing a continuous channel to receive the cantilevered handle member 1006 therethrough. In one embodiment, the second attachment bracket 1014*b* may include a bottom wall that prevents the cantilevered handle member 1006 from protruding thereto and aligns the bracket fastener apertures on the attachment brackets with the handle attachment apertures 1012*a-n* defined on the cantilevered handle member 1006. Each of the bracket channels defined by the respective attachment brackets 1014*a-b* are preferably shaped and sized to be slightly larger than the diameter of the cantilevered handle member 1006, thereby providing a snug or even compressive configuration between the attachment brackets 1014*a-b* and the cantilevered handle member 1006.

As such, the cantilevered handle member 1006 can be seen being selectively removably coupled to the first and second attachment brackets 1014*a-b* with a first fastener 1016*a* spanning through one of the plurality of handle attachment apertures 1012*a-n* and the first bracket fastener aperture and with a second fastener 1016*b* spanning through another of the plurality of handle attachment apertures 1012*a-n* and the second bracket fastener aperture. This advantageously provides two coupling attachment points for facilitating a more secure and safe attachment.

In one embodiment, the plurality of handle attachment apertures 1012*a-n* are disposed proximal to the second end 1010 of the cantilevered handle member 1006. Furthermore, the plurality of handle attachment apertures 1012*a-n* may also span through the cantilevered handle member 1006 and may be defined by a threaded wall of the cantilevered handle member 1006, thereby enabling the first and second fasteners 1016*a-b* to be threadedly engaged therein. In further embodiment, the handle attachment apertures 1012*a-n* are defined by a non-threaded wall of the cantilevered handle member and have the first and second fasteners disposed within the plurality of handle attachment apertures, respectively, and retained with at least one retention pin and/or clip.

In one embodiment, only the cantilevered handle member 1006 includes threaded portions operably configured to engage with the fasteners 1016*a-b*. In a preferred embodiment, the sidewall of the first and second attachment brackets 1014*a-b* defining the first and second bracket fastener apertures, respectively, are of a threaded configuration, thereby enabling the first and second fasteners 1016*a-b* to be threadedly engaged therewith and the cantilevered handle member 1006. As such, when desired for utilization by a user, the user will simply insert the cantilevered handle member 1006 into the first and second attachment brackets 1014*a-b* until the apertures are aligned, and then insert and engage the threaded fasteners 1016*a-b* therewith. When desired for removal, the user will simply remove the threaded fasteners 1016*a-b* and then remove the cantilevered handle member 1006.

While embodiments of the present invention have been described herein, again, modifications and additions can be made to the exemplary embodiments discussed without departing from the scope of the present disclosure.

What is claimed is:

1. In combination with a bicycle having a front wheel and a rear wheel both rotatably coupled to a frame assembly with two frame members disposed proximal to one of the at least two wheels, the improvement comprising:
    a cantilevered handle member with a first free end, with a second end opposing the first free end, with a handle member length separating the first free end and the second end, and disposed laterally adjacent to and extending in a direction outwardly away from the rear wheel and terminating at the first free end disposed above the rear wheel;
    a first attachment plate directly coupled to the cantilevered handle member, with an upper first plate end, a lower first plate end opposing the upper first plate end, a first plate length separating the upper and lower first plate ends, a left first plate side, a right first plate side opposing the left first plate side, a first plate width separating the left and right first plate sides, with a first plate lower U-shaped clip rotatably coupled to the first attachment plate in a cantilevered configuration, defining a first plate adjustment channel spanning longitudinally along the first plate length, and a first plate upper U-shaped clip vertically adjustable within the first plate adjustment channel and disposed in a cantilevered configuration with respect to the first attachment plate; and
    a second attachment plate with an upper second plate end, a lower second plate end opposing the upper second plate end, a second plate length separating the upper and lower second plate ends, a left second plate side, a right second plate side opposing the left second plate side, a second plate width separating the left and right second plate sides, with a second plate lower U-shaped clip rotatably coupled to the second attachment plate in a cantilevered configuration, defining a second plate adjustment channel spanning longitudinally along the second plate length, and a second plate upper U-shaped clip vertically adjustable within the second plate adjustment channel and disposed in a cantilevered configuration with respect to the second attachment plate, the first attachment plate and the second attachment plate coupled together with a plurality of plate fasteners in a plate attachment configuration that includes the first plate lower U-shaped clip and the second plate lower U-shaped clip collectively compressively retaining at least one of the two frame members disposed proximal to one of the at least two wheels and the first plate upper U-shaped clip and the second plate upper U-shaped clip compressively retaining at least one of the two frame members disposed proximal to one of the at least two wheels.

2. The improvement according to claim 1, wherein:
the first and second plate lower U-shaped clips are operably configured to rotate 360°.

3. The improvement according to claim 1, wherein:
the first and second plate upper U-shaped clips, are vertically adjustably and lockably coupled to the respective first and second attachment plates.

4. The improvement according to claim 3, wherein:
the first and second plate adjustment channels are each disposed in a parallel configuration with one another when in the plate attachment configuration.

5. The improvement according to claim 3, wherein:
the first and second plate adjustment channels each define a plurality laterally oriented and longitudinally displaced locking slats thereon, the first and second plate upper U-shaped clips are vertically adjustably and lockably coupled to the respective first and second attachment plates and each disposed within one of the plurality laterally oriented and longitudinally displaced locking slats.

6. The improvement according to claim 5, wherein the plurality locking slats defined on each of the first and second attachment plates are longitudinally displaced in equal lengths from one another.

7. The improvement according to claim 5, further comprising:
    a first plate clip peg with a first end of a shape of the plurality locking slats defined on the first attachment plate and disposed therein in the lockably coupled configuration and with a second end opposing the first end of the first plate clip peg and defining a clip channel with the upper first plate upper U-shaped clip disposed within the clip channel of the first plate clip peg; and
    a second plate clip peg with a first end of a shape of the plurality locking slats defined on the second attachment plate and disposed therein in the lockably coupled configuration and with a second end opposing the first end of the second plate clip peg and defining a clip channel with the upper second plate upper U-shaped clip disposed within the clip channel of the second plate clip peg.

8. The improvement according to claim 1, wherein:
the first plate lower U-shaped clip, the first plate upper U-shaped clip, the second plate lower U-shaped clip, and the second plate upper U-shaped clip have surfaces defining the U-shape that are each of an elastic material.

9. A bicycle training aid device comprising:
an elongated handle member with a first free end, with a second end opposing the first free end, with a handle member length separating the first free end and the second end;
a first attachment plate directly coupled to the cantilevered handle member, with an upper first plate end, a lower first plate end opposing the upper first plate end, a first plate length separating the upper and lower first plate ends, a left first plate side, a right first plate side opposing the left first plate side, a first plate width separating the left and right first plate sides, with first plate lower U-shaped clip rotatably coupled to the first attachment plate in a cantilevered configuration and with a surface defining the U-shape thereon that is of an elastic material, defining a first plate adjustment channel spanning longitudinally along the first plate length, and a first plate upper U-shaped clip vertically adjustable within the first plate adjustment channel, disposed in a cantilevered configuration with respect to the first attachment plate, and with a surface defining the U-shape thereon that is of an elastic material, the handle member projecting outward from the first attachment plate in a cantilevered configuration; and
a second attachment plate with an upper second plate end, a lower second plate end opposing the upper second plate end, a second plate length separating the upper and lower second plate ends, a left second plate side, a right second plate side opposing the left second plate side, a second plate width separating the left and right second plate sides, with a second plate lower U-shaped clip rotatably coupled to the second attachment plate in a cantilevered configuration and with a surface defining the U-shape thereon that is of an elastic material, defining a second plate adjustment channel spanning longitudinally along the second plate length, and a second plate upper U-shaped clip vertically adjustable within the second plate adjustment channel, disposed in a cantilevered configuration with respect to the second attachment plate, and with a surface defining the U-shape thereon that is of an elastic material, the first attachment plate and the second attachment plate operably configured to couple together with a plurality of plate fasteners in a plate attachment configuration with the first plate lower U-shaped clip and the second plate lower U-shaped clip facing and aligned with one another and the first plate upper U-shaped clip and the second plate upper U-shaped clip facing and aligned with one another.

10. The bicycle training aid device according to claim 9, wherein:
the first and second plate lower U-shaped clips are operably configured to rotate 360°.

11. The bicycle training aid device according to claim 9, wherein:
the first and second plate upper U-shaped clips, are vertically adjustably and lockably coupled to the respective first and second attachment plates.

12. The bicycle training aid device according to claim 11, wherein:
the first and second plate adjustment channels are each disposed in a parallel configuration with one another when in the plate attachment configuration.

13. The bicycle training aid device according to claim 11, wherein:
the first and second plate adjustment channels each define a plurality of laterally oriented and longitudinally displaced locking slats thereon, the first and second plate upper U-shaped clips are vertically adjustably and lockably coupled to the respective first and second attachment plates and each disposed within one of the plurality of laterally oriented and longitudinally displaced locking slats.

14. The bicycle training aid device according to claim 13, wherein the plurality locking slats defined on each of the first and second attachment plates are longitudinally displaced in equal lengths from one another.

15. The bicycle training aid device according to claim 13, further comprising:
a first plate clip peg with a first end of a shape of the plurality locking slats defined on the first attachment plate and disposed therein in the lockably coupled configuration and with a second end opposing the first end of the first plate clip peg and defining a clip channel with the upper first plate upper U-shaped clip disposed within the clip channel of the first plate clip peg; and
a second plate clip peg with a first end of a shape of the plurality locking slats defined on the second attachment plate and disposed therein in the lockably coupled configuration and with a second end opposing the first end of the second plate clip peg and defining a clip channel with the upper second plate upper U-shaped clip disposed within the clip channel of the second plate clip peg.

16. In combination with a bicycle having a front wheel and a rear wheel both rotatably coupled to a frame assembly with two frame members disposed proximal to the rear wheel, the improvement comprising:
a cantilevered handle member with a first free end, with a second end opposing the first free end, with a handle member length separating the first free end and the second end, having a plurality of handle attachment apertures defined thereon along the handle member length, and disposed laterally adjacent to and extending in a direction outwardly away from the rear wheel, terminating at the first free end, and disposed above the rear wheel;
a first attachment bracket directly coupled to one of the two frame members and with a sidewall defining an upper aperture, a lower aperture opposing the upper aperture of the sidewall of the first attachment bracket, a first bracket channel separating the upper and lower apertures of the sidewall of the first attachment bracket, and a first bracket fastener aperture; and
a second attachment bracket directly coupled to another of the two frame members and with a sidewall defining an upper aperture, a lower aperture opposing the upper aperture of the sidewall of the second attachment bracket, a second bracket channel separating the upper and lower apertures of the sidewall of the second attachment bracket and axially aligned with the first bracket channel, and a second bracket fastener aperture, the cantilevered handle member selectively removably coupled to the first and second attachment brackets with a first fastener spanning through one of the plurality of handle attachment apertures and the first bracket fastener aperture and with a second fastener spanning through another of the plurality of handle attachment apertures and the second bracket fastener aperture.

17. The improvement according to claim 16, wherein:
the plurality of handle attachment apertures are disposed proximal to the second end of the cantilevered handle member.

18. The improvement according to claim 17, wherein:
the plurality of handle attachment apertures span through the cantilevered handle member and are either defined by a threaded wall of the cantilevered handle member having the first and second fasteners threadedly engaged with the threaded wall of the cantilevered handle member or defined by a non-threaded wall of the cantilevered handle member having the first and second fasteners disposed within the plurality of handle attachment apertures, respectively, and retained with at least one retention pin—of the cantilevered handle member.

19. The improvement according to claim 18, wherein:
the sidewall of the first and second attachment brackets defining the first and second bracket fastener apertures, respectively, are of a threaded configuration and with the first and second fasteners threadedly engaged with the threaded wall of the cantilevered handle member and sidewall of the respective sidewall of the first and second attachment brackets defining the respective first and second bracket fastener apertures.

20. The improvement according to claim 16, wherein:
the first and second attachment brackets are welded to one of the two frame members.

\* \* \* \* \*